United States Patent [19]
Long

[11] Patent Number: 5,738,577
[45] Date of Patent: Apr. 14, 1998

[54] AUTOMATIC BUTT SKINNING MACHINE

[75] Inventor: John W. Long, Omaha, Nebr.

[73] Assignee: MAJA-Maschinenfabrik Hermen Schill GmbH, Tullastrasse, Germany

[21] Appl. No.: 499,665

[22] Filed: Jul. 7, 1995

[51] Int. Cl.$^6$ ................................................ A23B 5/16
[52] U.S. Cl. ................................. 452/127; 452/171
[58] Field of Search ........................ 452/127, 171, 452/125

[56] References Cited

U.S. PATENT DOCUMENTS

| | | | |
|---|---|---|---|
| 3,513,893 | 5/1970 | Townsend | 452/127 |
| 3,613,154 | 10/1971 | Townsend | 452/127 |
| 4,628,806 | 12/1986 | Murphy | 452/127 |
| 5,090,939 | 2/1992 | LeBlanc | 452/127 |
| 5,429,548 | 7/1995 | Long et al. | 452/127 |
| 5,476,417 | 12/1995 | Long et al. | 452/127 |

*Primary Examiner*—Willis Little
*Attorney, Agent, or Firm*—Zarley, McKee, Thomte, Voorhess & Sease

[57] ABSTRACT

An upper conveyor and trimming blade assembly for an automatic trimmer adapted for trimming a layer of material, conforming with the shape of a trimming blade, from a meat product. The assembly includes an upper conveyor mounted in a vertically spaced relation above a lower conveyor wherein cooperative movement of the upper and lower conveyor is operative to transport the meat product into trimming engagement with a trimming blade. A trimming blade is mounted on the skinning machine base frame, for trimming the unwanted material from the meat product. The trimming blade is mounted in a holder adapted to bend the blade into a shape conforming with the shape of the meat product being trimmed.

The assembly may be constructed as a replacement kit for installation on existing machines or installed during the fabrication of the automatic trimming machine.

11 Claims, 4 Drawing Sheets

AUTOMATIC BUTT SKINNING MACHINE

BACKGROUND OF THE INVENTION

1. Technical Field

The method and apparatus of this invention relate generally to an apparatus and method for automatically transporting a meat product for trimming a curved or non-linear portion of material (e.g., fat) from the meat product. More specifically, it relates to an apparatus and method of automatically feeding a meat product to a meat trimmer for trimming portions from a meat product which is of a generally rounded shape such as butts (beef, pork, etc.) and the like. As is well understood in the art, pork butts are also commonly referred to as pork shoulders. Additionally, meat "muscles" or "products" as used herein are meant to refer broadly to beef and pork butts such as sirloin butt, butt tenderloin, bottom sirloin butt, pork shoulder butt, boston butt and the like. Materials to be trimmed may be fat, membranes, skin, connective tissue, gristle, bone, or the like. Machines for accomplishing this trimming are referred to in the art as "skinning", "de-rinding", "de-fatting" or "trimming" machines.

Currently, extended, rounded meat products such as beef and pork butts, must usually be trimmed by hand or using machines with a feed mechanism which tend to pivot the product during the trimming process. Either way, it is difficult to properly trim the meat product, and both methods create the possibility of serious injury to the hands of the operator including cumulative trauma injuries and carpal tunnel injuries. Additionally, when using these prior art machines, there is a large reduction in efficiency due to the time required to perform the numerous hand strokes required. Furthermore, the numerous hand strokes required may lead to repetitive motion injuries. Consequently, it is highly desirable to automate the process of trimming extended or rounded meat products. Such automation leads to enhanced ergonomics, increased yield and increased production.

The present invention is adapted to be used on automatic meat trimmers of the type described generally in our U.S. Pat. No. 5,236,323 which is herein incorporated by reference. Specific examples of such machines are the Maja GEA421, SBA420, UNA500A, and ESB441 series machines. However, the invention's use is not limited to these machines.

2. Description of the Prior Art

Prior art devices for trimming unwanted portions from meat products are well known in the art. However, these devices are generally limited to meat products which are generally flat and may have the undesirable characteristic when used with rounded meat products, of pivoting or skewing the product during trimming.

Consequently, the trimming of an unwanted portion from a generally rounded product such as, but not limited to, beef and pork butts and the like, had to be accomplished by hand either using a knife such as described in Dubors, U.S. Pat. No. 5,025,175 and Townsend, U.S. Pat. No. 4,996,742 or a manual membrane skinning machine. These methods are extremely dangerous and/or time-consuming. Repetitive motion injuries, carpal tunnel problems, hand fatigue and lacerations are all possibilities resulting from hand skinning.

Therefore, an object of the present invention is to provide an apparatus and method of efficiently transporting a meat product into an automatic trimmer and safely and automatically removing unwanted material such as fat, membranes and the like from round meat products. Such products might include, but are not limited to, beef and pork butts, and the like.

Another object of the present invention is to provide an upper conveyor apparatus which is capable of transporting and trimming a variety of different sizes of beef or pork butts.

Another object is to provide an apparatus capable of automatically feeding a variety of beef and pork butts into an automatic trimming apparatus.

Another object of the present invention is to provide a feed mechanism capable of keeping the meat product in proper position during the trimming process.

Still another object of the present invention is to provide an apparatus which is capable of conveying meat products of a variety of consistencies and temperatures.

Another objective is to provide an apparatus which will accommodate a variety of blade shapes, sizes and types.

Finally, an object of the present invention is to provide an apparatus which is capable of automatic position adjustment to accommodate meat products of irregular shapes and thicknesses.

SUMMARY OF THE INVENTION

The present invention is directed to a method and apparatus for automatically conveying a variety of rounded, irregularly shaped meat products, such as beef and pork butts, into trimming position on an automatic trimmer and maintaining the product in correct trimming position. Such meat products may consist of a variety of beef, pork, poultry, fish, muscles and the like, and unwanted material may be any variety of fat, membranes, skin, connective tissue, gristle, bone and the like. The invention provides an upper conveyor and bent blade holder assembly to accommodate a wide range of beef and pork butt types, shapes and consistencies. The assembly is adapted to be utilized as a kit for installation on existing skinning machines or to be manufactured as part of the machine during its fabrication.

The invention thus provides a great advantage over the prior art meat conveyors by allowing these rounded portions of beef and pork butts to be automatically trimmed without the undesirable "twisting" effect resulting from prior art conveyor/positioning systems. Therefore, the irregular shaped meat products may be efficiently trimmed. Additionally, the process is greatly speeded up since the number of residual or "touch-up" manual trimming strokes which must be accomplished to achieve proper trimming is greatly reduced or even completely eliminated.

BRIEF DESCRIPTION OF THE DRAWINGS

FIG. is a perspective view of the upper conveyor assembly installed on an automatic skinning machine.

DESCRIPTION OF THE PREFERRED EMBODIMENT

One of the objectives of the invention is to provide a feed mechanism which will work for a variety of irregularly shaped, beef and pork butts. Due to the consistency and structure of such meat products, transportation of the meat product into trimming engagement with the blade is best accomplished by sandwiching the meat product between an upper and lower conveyer. Once in contact with the blade, the upper conveyor belt mechanism pressing against the meat provides sufficient gripping contact to maintain engagement with the trim blade. Examples of products for which the present invention provides an especially effective feed mechanism for beef and pork butts and the like. The apparatus of the present invention is adapted to be provided as a kit for installation on existing conventional skinning machines or may comprise part of an automatic skinning machine as manufactured.

Figure 1:
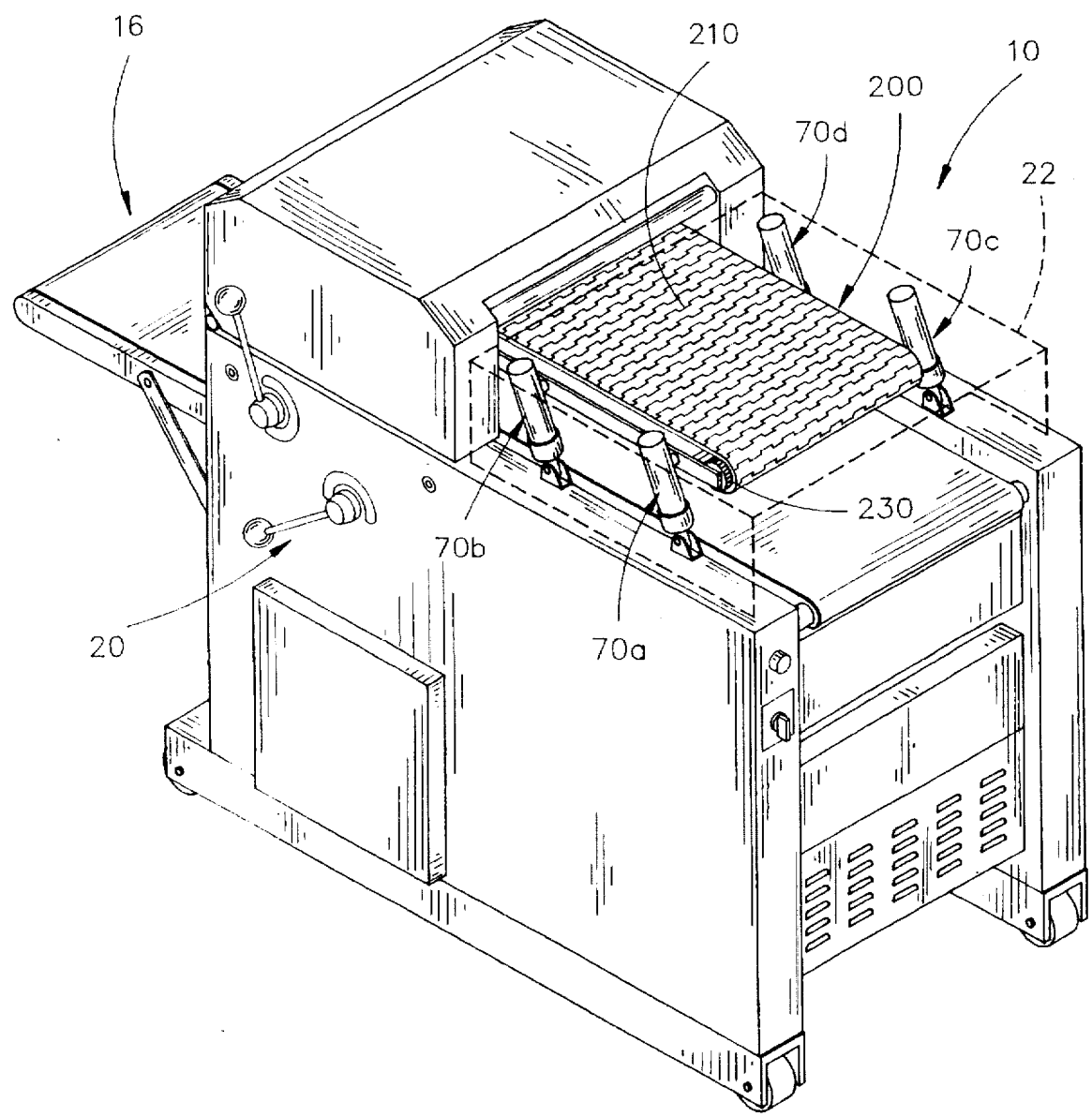

FIG. 1 is an external over-all view of the upper conveyor apparatus 10 and its attachment and utilization with an automatic trimmer apparatus discussed in more detail in our U.S. Pat. No. 5,236,323. In particular, the orientation and positioning of the upper conveyor apparatus 10 relative to the feed conveyer 14 is shown. A safety cage 22 would likely be provided in order to further protect the operator.

Figure 2:
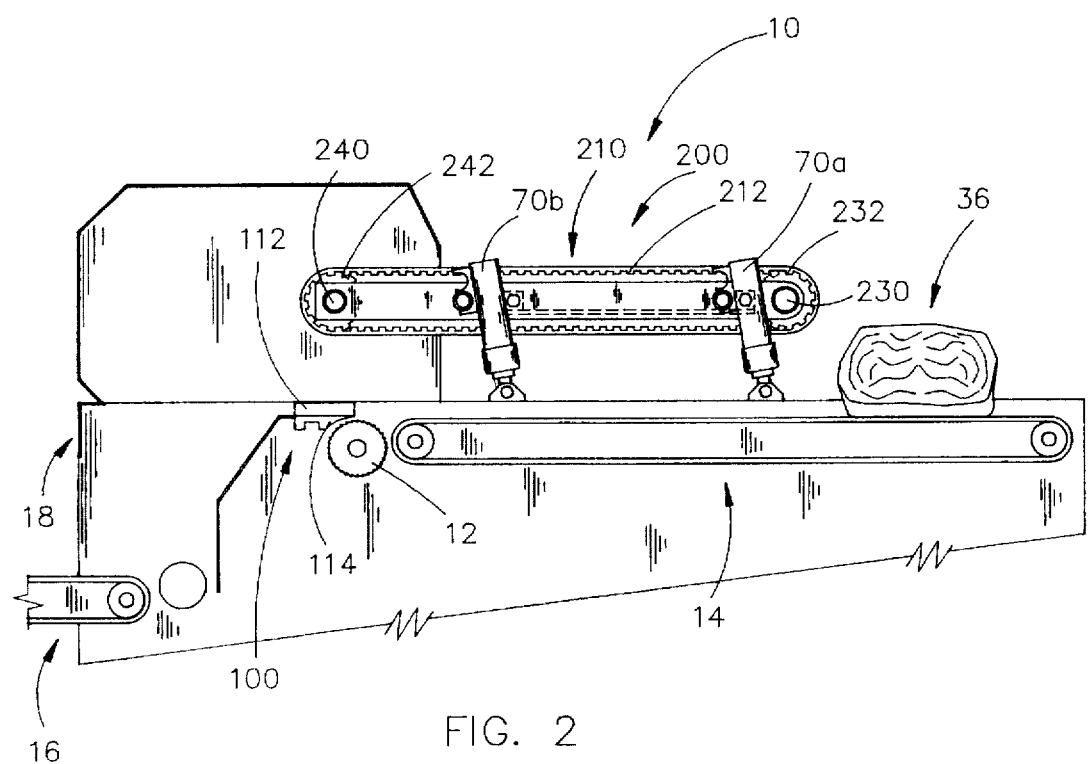
FIG. 2 is a is a side sectional view of the butt skinner showing the operation of the upper and lower conveyers and their positioning relative to the blade holder.
Figure 3:
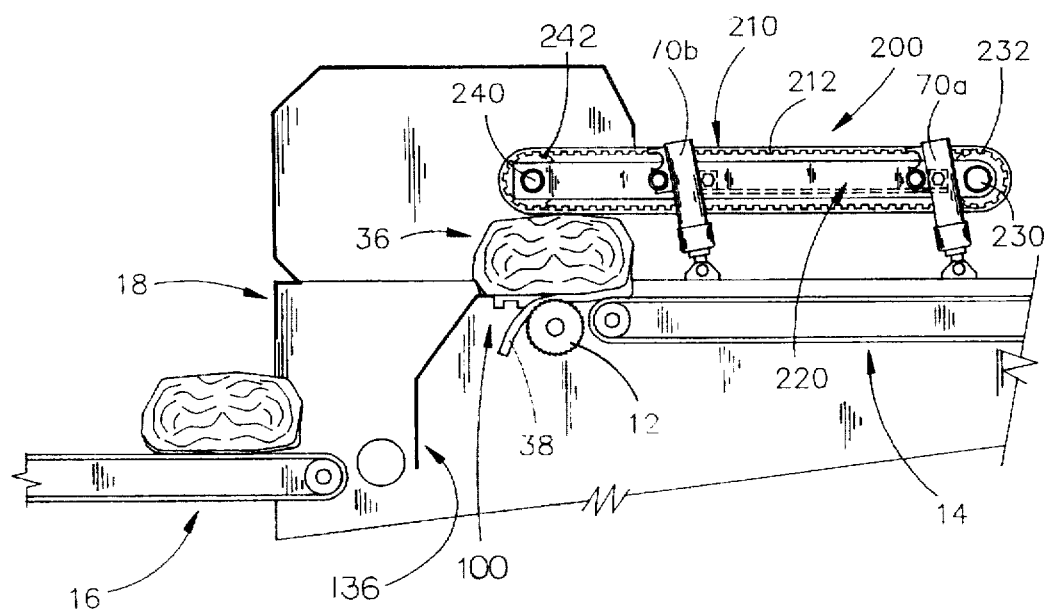
FIG. 3 is another side sectional view of the butt skinner showing the transport of a meat product over the blade and through the machine.
Figure 4:
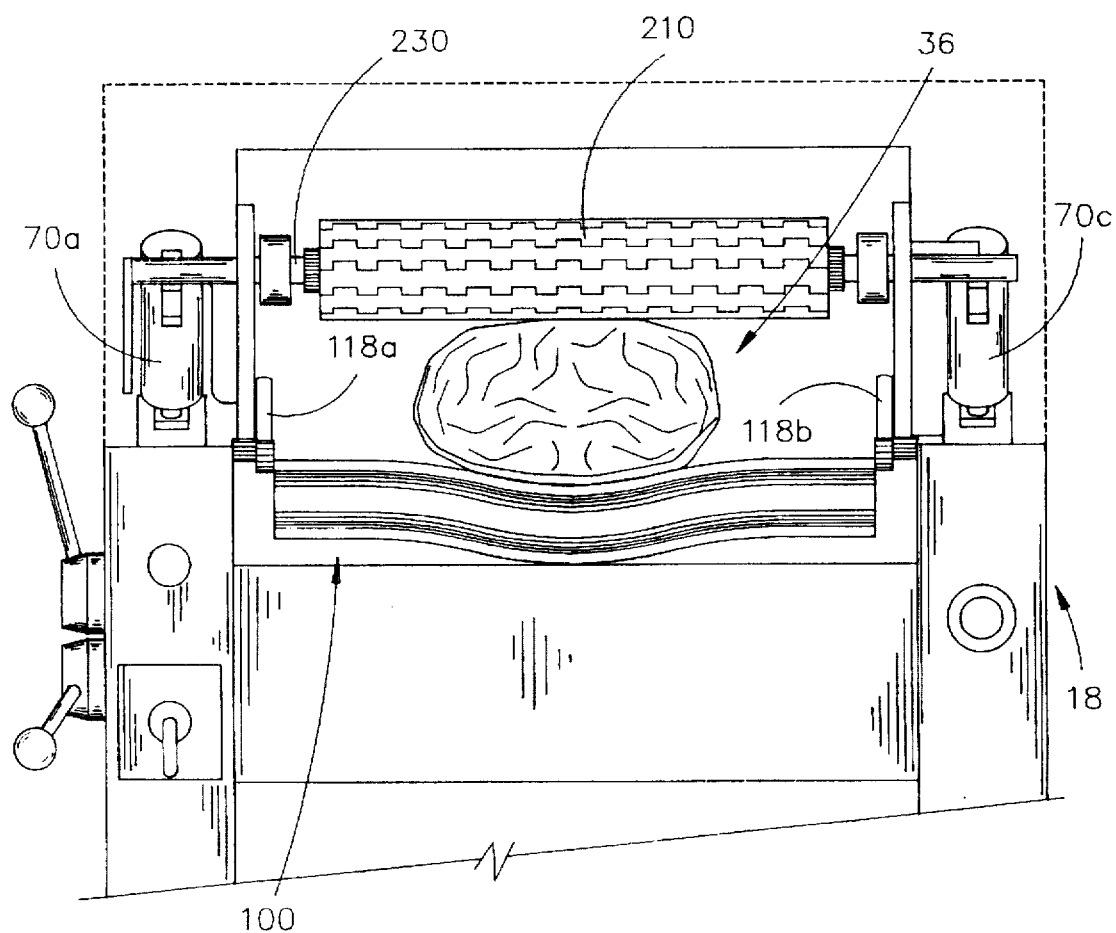
FIG. 4 is a front view of the apparatus showing with particular clarity the curved shape of the blade holder and its positioning relative to the upper conveyer.
Figure 5:
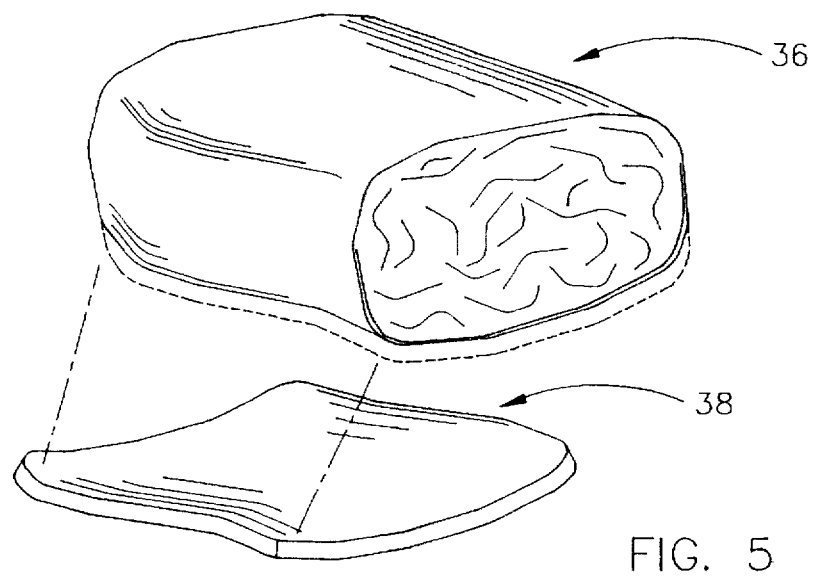
FIG. 5 is a perspective view of a meat product showing the portion trimmed therefrom.

The trimming operation of the invention is best shown in FIGS. 2–4. Meat product 36 is initially placed on lower conveyer 14 whereupon it is transported into contact with upper conveyer 200. As mentioned above, the most effective means for transporting meat products such as butts and the like , into engagement with a trimming blade 120, is to "sandwich" such meat products between feed conveyor 14 and upper conveyor 200. The cooperative movement of conveyors 14 and 200 move meat product 36 into trimming engagement with trimming means 100. When the meat product 36 is brought into contact with conveyor 200 by conveyor 14, it become sandwiched therebetween. With the clockwise (with respect to FIG. 2) rotation of the upper conveyer 200 in cooperation with the counter-clockwise rotation of lower conveyer 14, meat product 36 is moved rearwardly, bringing it into trimming engagement with trimming means It will be observed from FIG. 3 that the amount of material 38 trimmed is equal to the distance between the blade 120 and blade holder 114 and the toothroller 12. This distance, and consequently the amount of material trimmed, may be adjusted either manually as is commonly done with conventional skinning machines or automatically using some sensing device. In the case of manual adjustments, a lever 20 is usually provided for the adjustment. Rotation of lever 20 results in a change in the distance between blade 120 and roller As also shown in FIGS. 2 and 3, the upper conveyer frame 220 is mounted to base frame 18 by means of spring cylinders 70a –d. These spring cylinders 70a–d provide four axis of movement for upper conveyer 208 relative to the base frame 18 and lower conveyer 14. Thus, conveyor apparatus 10 may be pivoted about four independent points to accommodate irregularly shaped meat products 36 thereby maintaining continuous, even pressure thereon and facilitating engagement of the meat product 36 with the trimming means 100.

As seen in the figure, upper conveyer 200 extends rearwardly of lower conveyer 14 and over trimming means 100. Thus, upper conveyer 200 is positioned to exert pressure on the meat product while it is in trimming engagement with trimming means 100. This engagement between the upper conveyer 200 and the meat product causes the meat product to be run over blade 120 in trimming means 100 thereby trimming a portion of material 38, corresponding to the shape of the blade 120 and blade holder 114, therefrom.

As explained in more detail below in conjunction with FIGS. 4 and 6, blade 120 is sufficiently flexible to allow it to conform with the shape of the blade holder 110 base and clamping plates 114 and 112 respectively when it is clamped therebetween. Therefore, clamping and base plates 112 and 114 may be selected such that the shape of blade 120 corresponds with the shape of the meat product 36 being trimmed. Three examples of shapes which might be useful, include a "U" shape, a "V" shape and a rectangular shape. Clearly many other shapes may be used.

Once meat product 36 has been discharged from the rear of the apparatus by discharge means 16 (FIG. 3), the apparatus is ready to accommodate another meat product. The lower conveyor 14 transports another meat piece 36 to be trimmed into position, where the product 36 is engaged by upper conveyer 200 and sandwiched between upper conveyer 200 and lower conveyer 14. As mentioned above, meat product 36 is then transported cooperatively by lower conveyor 14 and upper conveyor 200, bringing it into trimming engagement with trimming blade 120 and the entire trimming cycle is started again.

Conveyor belt 210 is utilized in transporting a meat product to and into alignment with trimming means 100 (FIGS. 2 and 3). Conveyor 200 is especially well suited to use with "fleshy" meat products, such as beef and pork butts which do not have a great deal of bone material. As seen in the figures, especially FIGS. 2–4, the flat surface presented by belt 210 frictionally engages a significant portion of the top surface of the meat product This allows the top conveyor belt 210 to maintain the meat product 36 in trimming engagement with trimming means Upper conveyer 200 is comprised of a belt 210 forming a closed loop and being supported at its ends by front and rear sprockets 230 and 240. The rear sprocket 240 is connected internally to the skinning machine drive means (not shown) by conventional means such as chain, belts or the like. As seen in FIGS. 2 and 3, belt comprises a series of teeth 212 on the underside thereof. Front and rear sprockets 230 and 240 also comprise a series of teeth 232 and 242 thereon which are adapted to engage teeth 212 on the underside of belt 210. Thus, rear sprocket 240 is the drive sprocket which provides the means for rotating conveyor belt 210 by means of the engagement of sprocket teeth 242 and belt teeth 212. As mentioned, shaft 230 and associated gear teeth 232, support belt 210 at the end opposite sprocket 240.

As mentioned above, upper conveyer 200 is spaced vertically from lower conveyer. The spacing is sufficiently small as to cause meat product 36 to be "sandwiched" between, and frictionally engaged by, upper conveyor belt 210 and lower conveyer 14 (FIG. 3). The flexibility of belt 210 allows belt 210 to conform to the shape of the meat product 36 and greatly facilitates the frictional engagement of meat product 36 by belt 210. In the preferred embodiment, belt 210 would be constructed of plastic or other similar material. Additionally, since upper conveyer 200 is mounted to base frame 18 by means of springs 70a–d, upper conveyer 200 may then move upwardly in response to larger meat pieces. Furthermore, the height and tension of upper conveyer 200 may be adjusted as needed to accommodate the average size of product being run. Thus, the apparatus is adapted to frictionally engage a variety of product sizes.

After being engaged by the upper and lower conveyers, the product is then transported into trimming engagement with blade 120 (FIGS. 3 & 4) by means of the cooperative rotation of belt 210 and lower conveyer 14 and the frictional engagement of the meat product therebetween. As mentioned, bent blade holder 100 is curved to conform to the general shape of a beef or pork butt pieces being trimmed. A particular blade shape and curvature may be referred to as a "blade profile." As mentioned, the blade profile would chosen to conform to the shape of the meat product being trimmed and more specifically, to the shape of the portion to be removed. Since the apparatus of the present invention is adapted to work with a variety of sizes of meat products, it is desirable to have a variety of blade holder profiles.

A rigid assignment of meat types to blade holder profiles is not made as use of a particular blade profile involves a certain degree of intuition, experience, and preference on the part of the operator. Consequently, to at least some degree, several meat products may be accommodated by more than one blade profile. The blade profile is selected based on the size and shape of the particular piece, the amount of fat to be trimmed and the amount of fat to be left behind. As mentioned, the curved or "bent" blade holder illustrated is especially well suited for trimming fat from beef and pork butt portions.

Figure 6:
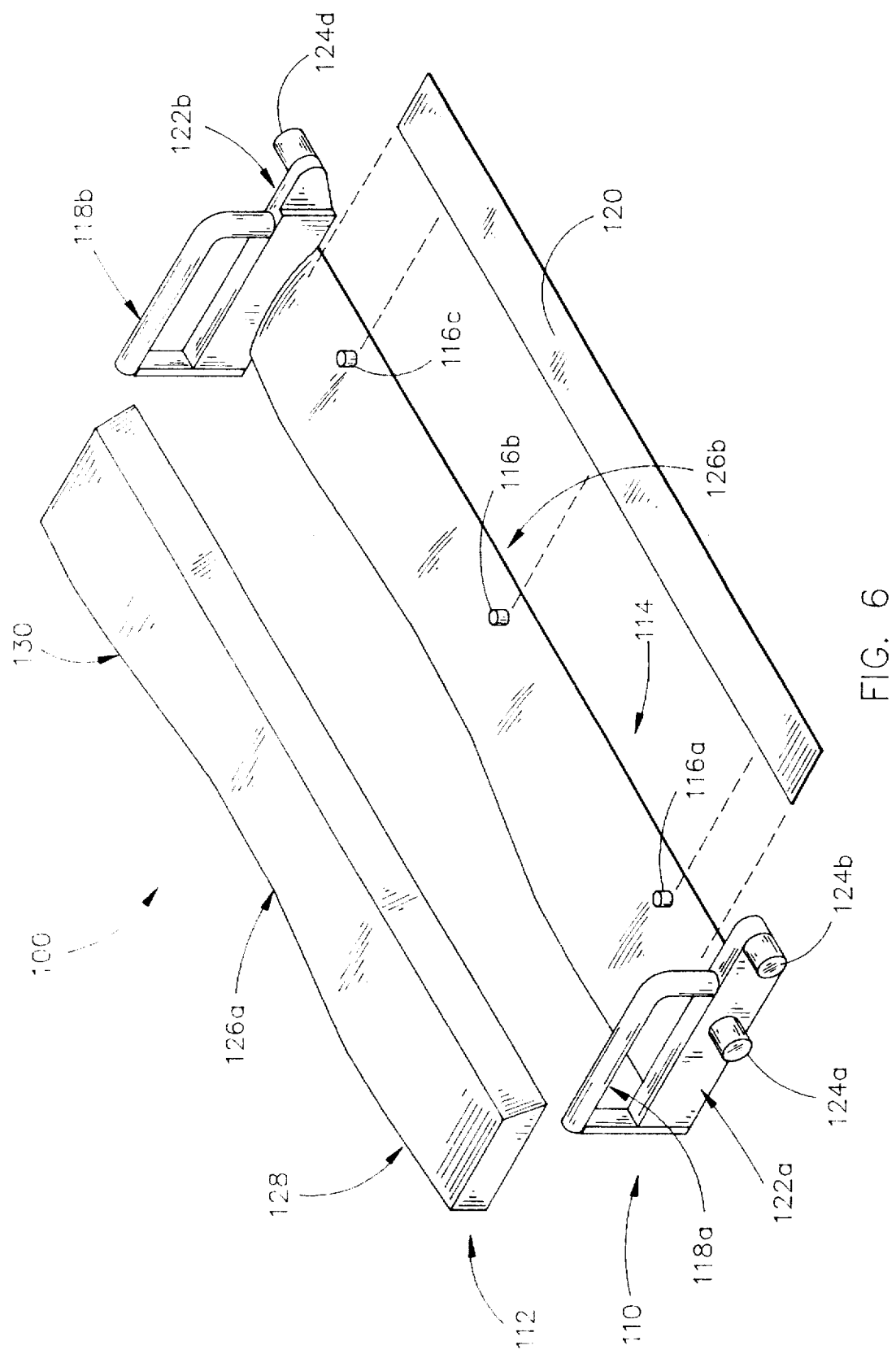
FIG. 6 is an exploded perspective view of the blade holder and how the various components thereof are assembled.

FIGS. 4 & 6 are front and perspective views respectively, of the bent blade holder portion of the present invention. It is immediately apparent from viewing FIG. 6 that the bent blade holder 100 of the present invention comprises a convex clamping and base curved portions 126a and 126b respectively, which differentiate it from the prior art blade holder. The bent blade holder 100 of the present invention also comprises clamping and base mounting plates 112 and 114 respectively with blade 120 held therebetween. In the preferred embodiment, flexible blade 120 is a stainless steel blade but it could alternately be any other cutting devices which could conform to the shape of the mounting plates. As mentioned above, flexibility of blade 120 allows it to conform to the shape of the clamping and base mounting plates 112 and 114. Therefore, a different cutting shape may be selected by selecting different shaped plates. As shown in the figures, flexible blade 120 is "sandwiched" between clamping mounting plate 112 and base mounting plate 114 which as mentioned comprise co-registered, convex clamping and base curves 126a and b.

In addition to convex clamping and base curves 126a and b, blade holder apparatus plates 112 and 114 comprise outer concave shaped portions 128 and 130. Again, the flexibility of blade allows it to conform to the shape of the clamping and base plates 112 and 114. Thus, the blade holder apparatus 100 produces a blade shape resembling an "inverse bell curve" when viewed from the front as shown in FIG. 4. This general inverse bell shape to the blade allows products having generally rounded lower portions and flatter outer portions, such as beef and pork butts, to be accurately and effectively trimmed using the blade holder apparatus of the present invention.

Blade holder 100 may also comprise installation handles 118a and b for installing and removing blade holder 100 from the automatic trimming apparatus (FIG. 6). Handles 118a and b are secured to mounting end plates 122a and b which are in turn secured to the ends of clamping and base mounting plates 112 and 114. Also shown in the figure are mounting pins 124a–d which are used for guiding and locking the blade holder apparatus 100 into proper position. Blade holder 100 may also comprise positioning means 116a–c for providing position stabilization of said blade relative to said holder. Positioning means 116a–c may comprise a plurality of posts positioned on base plate 114 and a plurality of co-registered indentations in clamping plate 112 such that the rearward edge of blade 120 may rest against positioning means. Finally, guide plate 136 is used for guiding blade holder apparatus 100 during installation into the automatic trimming apparatus as seen in FIGS. 3.

As mentioned, each blade holder may have a different degree of curvature, which would be adapted for use on particular cuts of meat. Therefore, the operator is able to select the blade holder having the appropriate curvatures adapted to efficient trimming of the particular meat product.

FIG. 1 is a perspective view, respectively, of the apparatus of the present invention installed on an example of a conventional automatic skinning machine. As mentioned above, the present invention is adapted to work on automatic skinning machines. Examples of such machines are the MAJA GEA421, SBA420, UBA500A, and ESB441 series machines.

As mentioned above, the apparatus of the present invention is adapted to be provided as a kit for installation on existing conventional skinning machines or may comprise part of an automatic skinning machine as manufactured. The apparatus of the present invention is adapted to easily fit on any conventional skinning machine conventional automatic skinning machines, and is especially well suited for machines such as the MAJA GEA421, SBA 420, UBA500A, ESB 441 and the like. If the apparatus is to be sold as a replacement kit, it would most likely include the components discussed above.

It is obvious that numerous other modifications and variations of the present invention are possible in view of the above teachings. For example, an important modification previously mentioned is the use of various blade profiles to accommodate various meat product consistencies and sizes. Another modification would be to incorporate an adjustment means for adjusting the height of the blade from the feed roller in order to further accommodate different meat types and trim amounts. Such an adjustment means might be manual or automatic. A means might be incorporated to adjust the blade profile in "real time" by adjusting the blade mounting plates. Various paddle and finger combinations and construction material types could be used to accommodate various meat product consistencies and sizes. Another modification would be to incorporate an adjustment means for adjusting the tension and initial positioning of the spring cylinders to further accommodate different meat types. Such an adjustment means might be manual or automatic. Finally, the width of the belt may be adjusted to accommodate various meat muscles.

Therefore it is to be understood that the above description is intended in no way to limit the scope of protection of the claims and is representative only of the several possible embodiments of the present invention.

There has thus been shown and described an invention which accomplishes at least all of the stated objects.

I claim:

1. An upper conveyor and trimming means assembly kit for installation on an automatic trimmer wherein a layer of material conforming with the shape of a trimming means blade is trimmed from a meat product, the automatic trimmer including a base frame; a lower conveyer extending forwardly of the trimming means, for transporting the meat product, in cooperation with an upper conveyer, into trimming engagement with the trimming means, drive means for driving the upper and lower conveyors, and a discharge means for discharging the trimmed meat product, the upper conveyor and trimming means assembly kit comprising:

an upper conveyor frame for mounting and supporting the upper conveyor;

means for mounting said upper conveyor frame on said automatic trimmer base frame in a vertically spaced relation above a lower conveyer;

first and second shafts mounted adjacent each end of said upper conveyor frame, said first shaft being engagable with and rotatable by a drive means;

an upper conveyor means mounted between and engaged with said first and second shafts on said upper conveyor frame such that rotation of said first shaft by said drive means causes circulation of said conveyor means;

trimming means mounted on said base frame for trimming unwanted material from the meat product, the trimming means having, a flexible blade;

a base plate having a base curved surface of a size and shape for removably receiving said blade;

a clamping plate adapted to be removably secured to said base plate and having a clamping curved surface substantially conforming to said base curved surface;

means for removably securing said clamping plate to said base plate thereby to removably secure the blade between said base and clamping plates and to bend said blade to conform to said base and clamping curved surfaces; and means for mounting said trimming means on the automatic skinning machine base frame wherein cooperative movement of said upper and lower conveyor means and said feed means is operative to transport said meat product into trimming engagement with said trimming means such that a portion of material conforming to the curve of said trimming means is trimmed therefrom.

2. The upper conveyor and trimming means assembly kit of claim 1 wherein said upper conveyor means comprises a belt having a generally flat outer surface and a grooved inner surface, said grooved inner surface engaging said first and second drive shafts such that rotation of said first shaft by said drive means causes circulation of said upper conveyor belt and of said lower conveyer means such that upon placement of said meat product on said lower conveyer means, circulation of said upper conveyor belt and said lower conveyer means causes said meat product to be engaged therebetween and moved rearward into engagement with said trimming means.

3. The upper conveyor and trimming means assembly kit of claim 1 wherein said means for mounting said conveyor frame comprises a plurality of spring means connecting said upper conveyer frame to said base frame and permitting movement of said upper conveyor frame relative to said base frame.

4. The upper conveyor and trimming means assembly kit of claim 1 wherein said trimming means further comprises positioning means for stabilizing the position of said blade relative to said base and clamping plates.

5. The upper conveyor and trimming means assembly kit of claim 4 wherein said positioning means comprises a plurality of position stabilizing studs and a plurality of holes adapted to receive said studs.

6. The upper conveyor and trimming means assembly kit of claim 1 further comprising a guide plate means for facilitating the installation of said trimming means in said base frame.

7. The upper conveyor and trimming means assembly kit of claim 1 wherein said base and clamping plate curves each comprise two generally convex shaped portions at the outer portions of said plate and a generally concave shaped portion therebetween and positioned substantially at the plate center thereby creating an "inverse bell shaped curve" appearance when viewed from the front of said holder.

8. The upper conveyor and trimming means assembly kit of claim 1 wherein said base and clamping plates further comprise a front surface and wherein said base and clamping plate front surfaces lie substantially in a vertical plane.

9. In combination, an upper conveyor and trimming means assembly kit for installation on an automatic trimmer wherein a layer of material conforming with the shape of a trimming means blade is trimmed from a meat product, the automatic trimmer including a base frame; a lower conveyer extending forwardly of the trimming means, for transporting the meat product, in cooperation with an upper conveyer, into trimming engagement with the trimming means, drive means for driving the upper and lower conveyors, and a discharge means for discharging the trimmed meat product, the upper conveyor and trimming means assembly kit comprising, an upper conveyor frame for mounting and supporting the upper conveyor, means for mounting said upper conveyor frame on said automatic trimmer base frame in a vertically spaced relation above a lower conveyer, first and second shafts mounted adjacent each end of said upper conveyor frame, said first shaft being engagable with and rotatable by a drive means, an upper conveyor means mounted between and engaged with said first and second shafts on said upper conveyor frame such that rotation of said first shaft by said drive means circulation of said conveyor means, trimming means mounted on said base frame for trimming unwanted material from the meat product, the trimming means having, a flexible blade;

a base plate having a base curved surface of a size and shape for removably receiving said blade, a clamping plate adapted to be removably secured to said base plate and having a clamping curved surface substantially conforming to said base curved surface, means for removably securing said clamping plate to said base plate thereby to removably secure the blade between said base and clamping plates and to bend said blade to conform to said base and clamping curved surfaces, and means for mounting said trimming means on the automatic skinning machine base frame wherein cooperative movement of said upper and lower conveyor means and said feed means is operative to transport said meat product into trimming engagement with said trimming means such that a portion of material conforming to the curve of said trimming means is trimmed therefrom.

10. A method of trimming a layer of unwanted material from a meat product:

providing an automatic skinning machine having a lower conveyer and an upper conveyer vertically spaced therefrom, a flexible trimming blade, and at least one bent blade holder having a curvature therein;

selecting a meat product to be trimmed;

selecting a bent blade holder adapted to removably receive said flexible trimming blade and having a curvature therein corresponding to the shape and amount of material to be trimmed from said meat product;

installing said flexible trimming blade in said bent blade holder;

installing said bent blade holder and associated flexible trimming blade in said automatic skinning machine;

placing a meat product to be trimmed on said lower conveyer;

advancing said meat product on said lower conveyer to said upper conveyer;

advancing said upper conveyer in a direction to engage said meat product between said upper and lower conveyers;

advancing said meat product into trimming engagement with said flexible trimming blade;

trimming said layer of material from said meat product corresponding to said selected blade holder curvature; and discharging said trimmed meat product from said trimmer.

11. The method of claim 10 wherein the step of providing a bent blade holder further comprises the step of:

providing a bent blade holder having,
- a base plate having a base curved surface of a size and shape for removably receiving said blade and having a plurality of positioning studs for positioning said flexible blade on said base plate;
- a clamping plate adapted to be removably secured to said base plate and having a clamping curved surface substantially conforming to said base curved surface;
- means for removably securing said clamping plate to said base plate, and wherein the step of installing a flexible blade in the bent blade holder comprises positioning said blade on said base plate adjacent said positioning studs, removably securing said base and clamping plates and bending said blade to conform to the shape thereof.

* * * * *